United States Patent [19]

Sakashita et al.

[11] Patent Number: 5,654,597
[45] Date of Patent: Aug. 5, 1997

[54] MAGNETIC DISK DRIVE MOTOR

[75] Inventors: Hiroshi Sakashita; Eiji Arasaki, both of Nagano, Japan

[73] Assignee: Kabushiki Kaisha Sankyo Seiki Seisakusho, Nagano, Japan

[21] Appl. No.: 525,178

[22] Filed: Sep. 8, 1995

[51] Int. Cl.[6] .............................. H02K 7/04; H02K 7/08
[52] U.S. Cl. .................. 310/51; 310/90; 384/118; 384/276; 384/295; 384/620; 384/626
[58] Field of Search ..................... 310/51, 67, 81, 310/90; 384/118, 276, 295, 292, 220, 226; D15/143

[56] References Cited

U.S. PATENT DOCUMENTS

| Re. 34,268 | 6/1993 | Muller | 310/67 R |
|---|---|---|---|
| D. 227,397 | 6/1973 | Steinke | D15/143 |
| 3,727,396 | 4/1973 | Hetzel | 310/21 |
| 4,851,731 | 7/1989 | Saotome et al. | 310/258 |
| 5,036,235 | 7/1991 | Kleckner | 310/90.5 |
| 5,109,171 | 4/1992 | Schmider | 310/51 |

FOREIGN PATENT DOCUMENTS

| 217377 | 1/1985 | Germany | 310/90 |
|---|---|---|---|
| 77341 | 4/1988 | Japan | 310/51 |
| 2-88463 | 7/1990 | Japan | 310/51 |
| 115146 | 5/1993 | Japan | 310/90 |

Primary Examiner—Thomas M. Dougherty
Assistant Examiner—Karl Imayoshi Tamai
Attorney, Agent, or Firm—Sughrue, Mion, Zinn, Macpeak & Seas

[57] ABSTRACT

A magnetic disk drive motor includes a hub stand for driving a disk while carrying the disk thereon, a shaft fixed to the middle of the hub stand, a rotor case attached to an end of the shaft and having a drive magnet on an inner side of a circumferential wall thereof, a substantially cylindrical housing rotatably supporting the shaft through a bearing, and a base plate supporting a stator core, wherein an end of the bearing is in slidable contact with the hub stand; and at least a part of the one end surface of the bearing is cut away.

11 Claims, 6 Drawing Sheets

MAGNETIC DISK DRIVE MOTOR

BACKGROUND OF THE INVENTION

1. Field of the Invention

The device pertains to magnetic disk drive motors applied to, e.g., floppy disk drive apparatuses or the like.

2. Related Art

Magnetic disk drive motors for driving to rotate media such as floppy disks are known. FIGS. 18 and 19 show an exemplary conventional magnetic disk drive motor. In FIG. 18, a housing 34 is cylindrical, and has two bearings 33, 33, upper and lower, fitted with the inner circumferential surface thereof. The bearings 33, 33 are made of a sintered member or the like. On the outer circumferential surface of the housing 34 is a collar portion 34a. On the bottom surface of the collar portion 34a is a stator core 35. The stator core 35 has a plurality of salient poles on the outer circumference thereof, and a coil 41 is wound around each salient pole. The thus constructed stator assembly with the housing 34 and the stator core 35 is mounted on a base plate 36. Between the base plate 36 and the bottom surface of the stator core 35 is a core holder 38, and a bottom portion of the core holder 38 is fitted into a hole 36a formed in the base plate 36.

A shaft 32 is inserted into the inner circumferential side of the bearings 33, 33 fitted with the inner circumferential surface of the housing 34. The shaft 32 not only is supported by the bearings 33 in the radial direction, but also has the bottom thereof supported by a thrust bearing 37 in the thrust direction. Thus, the shaft 32 is rotatable.

A hub stand 31 for carrying a medium or the like thereon is set and fixed to the top portion of the shaft 32, and a cuplike rotor case 40 is fixed to a lower edge portion of the hub stand 31 by caulking or the like. A drive magnet 42 is attached to the inner surface of the circumferential wall of the rotor case 40. The inner circumferential surface of the drive magnet 42 confronts the salient poles of the stator core 35 through a predetermined gap. As a result of this construction, the drive magnet 42 is energized by controlling electric conduction to the coil 41 wound around the salient poles, and the rotor 40 and the shaft 32 are therefore driven to rotate.

In the thus constructed conventional magnetic disk drive motor, the bearings 33, 33 are of the oil impregnated metal powdered type, and the shaft 32 is inserted into the bearings 33. As a result, there is a slight gap between the shaft 32 and the bearings 33, and this gap has been the source for causing vibration and play at the top of the shaft 32 when the magnetic disk drive motor is rotated.

The vibration and play caused at the top of the shaft 32 during the rotation of the magnetic disk drive motor is eliminated by applying lateral pressure to the shaft 32 and biasing a part of the outer circumferential surface of the shaft 32 onto the inner circumferential surface of the bearing 33. A lateral pressure applying method disclosed in Unexamined Japanese Utility Model Publication No. Hei. 2-88463 is such that a lateral pressure applying magnet is interposed between predetermined salient poles of the stator core and attracting a part of the rotor case with the lateral pressure applying magnet.

Progress in the downsizing or thin-sizing of floppy disk drive apparatuses and the like in recent years has led to a growing tendency toward the downsizing or thin-sizing of magnetic disk drive motors. However, when the magnetic disk drive motors are downsized, a sufficient space between the salient poles of the stator core 35 for mounting the lateral pressure applying magnet cannot be reserved. In addition, the thin-sizing of the magnetic disk drive motor leads to the thin-sizing of the lateral pressure applying magnet, which in turn reduces magnetically attracting force. Therefore, even if the lateral pressure applying magnet is used, it is difficult to obtain sufficient lateral pressure.

Further, to mount the lateral pressure applying magnet between the salient poles of the stator core 35 has been a factor for raising the assembling cost and the material cost.

SUMMARY OF THE INVENTION

The device has been made to overcome these problems. The object of the device is, therefore, to provide an inexpensive magnetic disk drive motor capable of applying lateral pressure to the shaft independently of the size of the motor.

A first aspect of the device is applied to a magnetic disk drive motor including: a hub stand for driving a disk while carrying the disk thereon; a shaft being fixed to the middle of the hub stand; a rotor case being attached to an end of the shaft and having a drive magnet on an inner side of a circumferential wall thereof; a substantially cylindrical housing rotatably supporting the shaft through a bearing; and a base plate supporting a stator core. In such magnetic disk drive motor, an end of the bearing is in slidable contact with the hub stand; and at least a part of the one end surface of the bearing is cut away.

A second aspect of the device is characterized as inclining the housing with respect to the shaft.

A third aspect of the device is characterized as interposing a spacer between the base plate or the housing of the magnetic disk drive motor and a chassis of a magnetic disk drive apparatus.

A fourth aspect of the device is characterized as integrally forming the housing and the bearing of a sintered member.

A fifth aspect of the device is characterized as projecting a part of the base plate confronting the drive magnet toward the drive magnet.

The shaft is supported in the thrust direction by not only forming a cutaway portion on an end surface of the bearing but also by causing the hub stand to come in slidable contact with the end surface of the bearing having the cutaway portion. As a result of this construction, the shaft is inclined within the range of a gap between the shaft and the bearing, which in turn applies lateral pressure to the shaft.

DETAILED DESCRIPTION OF THE PREFERRED EMBODIMENTS

Figure 1:
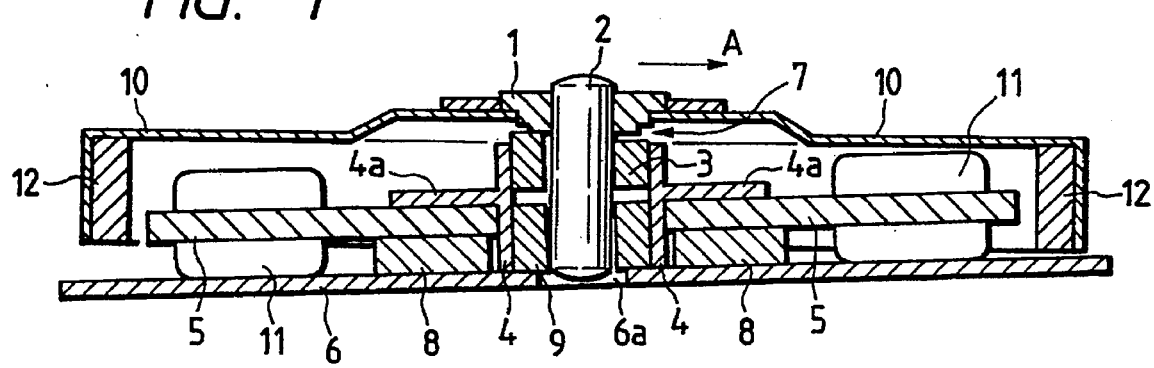
FIG. 1 is a sectional view showing a magnetic disk drive motor, which is an embodiment of the device.
Figure 2:
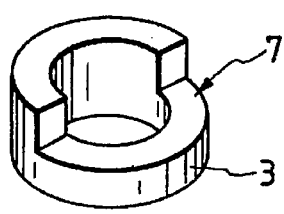
FIG. 2 is a perspective view showing an exemplary bearing used for the magnetic disk drive motor.

Magnetic disk drive motors, which are embodiments of the device, will now be described. In FIG. 1, a housing 4 is cylindrical, and has two bearings 3, 9, upper and lower, fitted with the inner circumferential surface thereof. The bearings 3, 9 are made of a sintered member or the like. Out of these two upper and lower bearings 3, 9, the lower bearing 9 is completely cylindrical, whereas the upper bearing 3 has, as shown in FIG. 2, a cutaway portion 7 formed by cutting about half a portion of the top surface of the bearing away along the centerline of the bearing.

In FIG. 1, on the outer circumferential surface of the housing 4 is a collar portion 4a. On the bottom surface of the collar portion 4a is a stator core 5. The stator core 5 is formed by laminating a plurality of core elements. From the outer circumference of the stator core 5 project a plurality of salient poles, each salient pole having a coil 11 wound around. The stator assembly constructed of the housing 4 and the stator core 5 is mounted on a base plate 6 made of iron, and a spacer 8 is interposed between the base plate 6 and the bottom surface of the stator core 5.

A shaft 2 is inserted into the inner circumferential side of the bearings 3, 9 fitted with the inner circumferential surface of the housing 4. The shaft 2 is not only supported by the bearings 3, 9 in the radial direction, but also has the bottom thereof inserted into a hole 6a formed in the middle of the base plate 6. A hub stand 1 is set to the top portion of the shaft 2, the hub stand 1 serving to carry a medium such as a floppy disk. The bottom of the hub stand 1 is abutted against the top of the bearing 3, so that the shaft 2 attached to the hub stand 1 is supported in the thrust direction by the bearing 3. Substantially half or more of the top portion of the bearing 3 is cut away as shown in FIG. 2 to form the cutaway portion 7. As a result of this construction, a portion of the hub stand 1 located above the cutaway portion 7 is collapsed toward the cutaway portion 7 so that the shaft 2 is inclined toward the cutaway portion 7.

Figure 3:
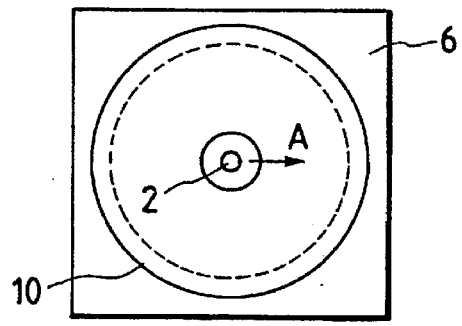
FIG. 3 is a plan view of the magnetic disk drive motor.

The hub stand 1 is fixed to a cuplike rotor case 10 by caulking or the like. Since the shaft 2 is inclined toward the cutaway portion 7, the rotor case 10 mounted on the hub stand 1 is also inclined in the same direction, i.e., in the direction indicated by an arrow A in FIGS. 1 and 3. On the inner surface of the circumferential wall of the rotor case 10 is a drive magnet 12. The inner surface of the drive magnet 12 confronts the salient poles of the stator core 5 through a gap. As a result of this construction, the drive magnet 12 is energized by controlling electric conduction to the coil 11 wound around the respective salient poles of the stator core 5, and the rotor case 10 and the shaft 2 are therefore driven to rotate.

As described above, not only the bottom surface of the hub stand 1 that is fixed to the shaft 2 is carried on the top surface of the bearing 3 and the shaft 2 is therefore supported by the bearing 3 in the thrust direction, but also the cutaway portion 7 is formed in the top portion of the bearing 3. Therefore, part of the hub stand 1 mounted on the shaft 2 drops down toward the cutaway portion 7, which in turn causes the shaft 2 to be inclined toward the cutaway portion 7. By the shaft 2 being inclined toward the cutaway portion 7, the drive magnet 12 on the side toward which the rotor case 10 is inclined comes closer to the base plate 6 made of iron, and this increases attracting force between the base plate 6 and the drive magnet 12 at this portion. The increased attracting force contributes not only to keeping the rotor case 10 and the shaft 2 in the inclined position at all times, but also to causing lateral pressure to be applied to the shaft 2, which in turn allows the shaft 2 to be driven to rotate while biased onto a predetermined position on the inner circumferential surface of the bearing 3. As a result of this construction, a play- and vibration-free rotation of the hub stand 1 can be obtained, and a cost reduction can be achieved with the lateral pressure applying magnet no longer required. Further, a sufficient lateral pressure to incline the shaft 2 can be obtained even if the magnet disk drive motor is downsized or thin-sized.

Figure 4A:
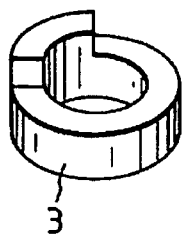
FIGS. 4(a) to 4(c) are perspective views showing various types of bearings applicable to the magnetic disk drive motor.
Figure 4B:
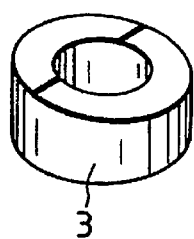
Figure 4C:
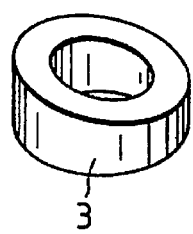

It may be noted that the shape of the shaft 2 used in the aforementioned embodiment is not limited to that shown in FIG. 2, but may take various shapes. For example, a portion that is more than half the top portion of the bearing 3 may be cut away as shown in FIG. 4(a), or a portion that is more than half the top portion of the bearing 3 may be cut away so as to be sloped as shown in FIG. 4(b). Further, the entire part of the top portion of the bearing 3 may be sloped as shown in FIG. 4(c). Any one of these designs contributes to eliminating vibration and play at the time the shaft 2 is being rotated by inclining the shaft 2 and thereby applying lateral pressure to the shaft 2 by means of attracting force between the drive magnet 12 and the base plate 6.

Figure 5:
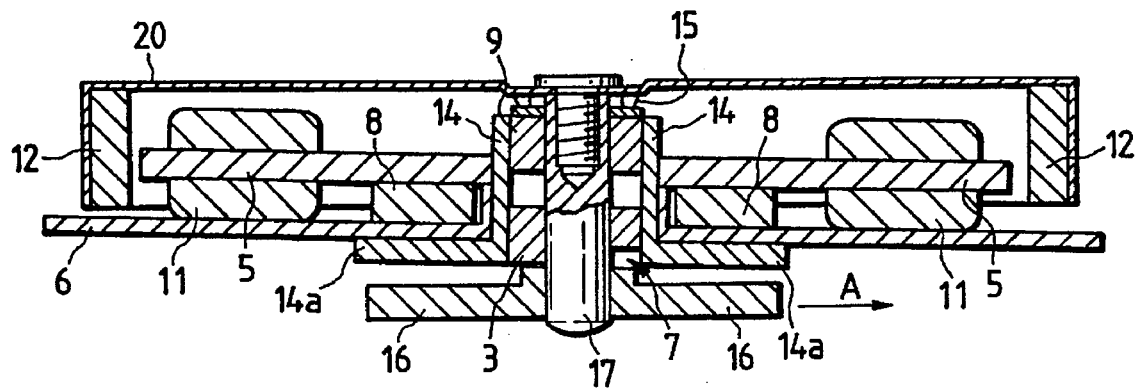
FIG. 5 is a sectional view showing a magnetic disk drive motor, which is another embodiment of the device.

Another embodiment will be described next. In FIG. 5, a housing 14 is cylindrical, and has two bearings 3, 9, upper and lower, fitted with the inner circumferential surface thereof. The bearings 3, 9 are made of a sintered member or the like. Out of these two upper and lower bearings 3, 9, the upper bearing 9 is completely cylindrical, whereas the lower bearing 3 has, similarly to the aforementioned embodiment, a cutaway portion 7 formed by cutting about half the top portion of the bearing away along the centerline of the bearing. The bearing 3 is set so that the cutaway portion 7 faces downward.

On the bottom portion of the housing 14 is a collar portion 14a. Placed on the top surface of the collar portion 14a is a base plate 6 made of iron. A core holder 8 is fitted with the outer circumference of the housing 14 on the base plate 6. Further, a stator core 5 is mounted on the top surface of the core holder 8. The stator core 5 is formed by laminating a plurality of core elements. From the outer circumference of the stator core project a plurality of salient poles, each salient pole having a coil 11 wound around.

A shaft 17 is inserted into the inner circumferential side of the bearings 3, 9 fitted with the inner circumferential surface of the housing 14. The shaft 17 is supported by the bearings 3, 9 in the radial direction. A hub stand 16 is attached to the bottom portion of the shaft 17. The top surface of the boss portion of the hub stand 16 is abutted against the bottom surface of the bearing 3. A cuplike rotor case 20 is fixed to the top portion of the shaft 17 with machine screws, and a belleville spring 15 for applying pre-load is interposed between the rotor case 20 and the top surface of the bearing 9. This pre-load applying belleville spring 15 is urged upward with respect to the bearing 9 and the housing 14. On the inner side of the circumferential wall of the rotor case 20 is a drive magnet 12, and the inner circumferential surface of the drive magnet 12 confronts the respective salient poles of the stator core 5 while interposing a gap therebetween. As a result of this construction, the drive magnet 12 is energized by controlling electric conduction to the coil 11 wound around the respective salient poles of the stator core 5, and the rotor case 20, the shaft 17, and the hub stand 16 are therefore driven to rotate.

In the aforementioned embodiment, it is only the bottom portion of the lower bearing 3 which is cut away out of the two upper and lower bearings 9, 3. In addition, the shaft 17 is biased upward by the pre-load applying belleville spring 15. Therefore, a reaction acting in a direction opposite to the shaft 17 biasing direction, i.e., downward is produced on the end surface of the boss of the hub stand 16 which is abutted against the bottom surface of the bearing 3. On the other hand, a portion of the hub stand 16 which is below the cutaway portion 7 of the bearing 3 rises toward the end surface of the cutaway portion 7 of the bearing 3. In association therewith, the shaft 17 is inclined within a gap formed with respect to the bearing 3, which in turn applies lateral pressure to the outer circumference of the shaft 17 with the shaft 17 being biased onto predetermined inner portions of the bearings 9, 3. When the magnetic disk drive motor is driven to rotate, the shaft 17 is driven to rotate while biased onto the inner circumferential surfaces of the bearings 3, 9.

The thus constructed magnetic disk drive motor, requiring no separately prepared magnet dedicated to applying lateral pressure as in the case of the aforementioned embodiment, is advantageous in not only reducing the cost of manufacture but also eliminating vibration and play at the time of rotation. Further, the shaft 17 can be inclined independently of the size and thickness of the magnetic disk drive motor, thereby allowing a magnetic disk drive motor free from vibration and play to be provided even if the motor is downsized or thin-sized.

Figure 6:
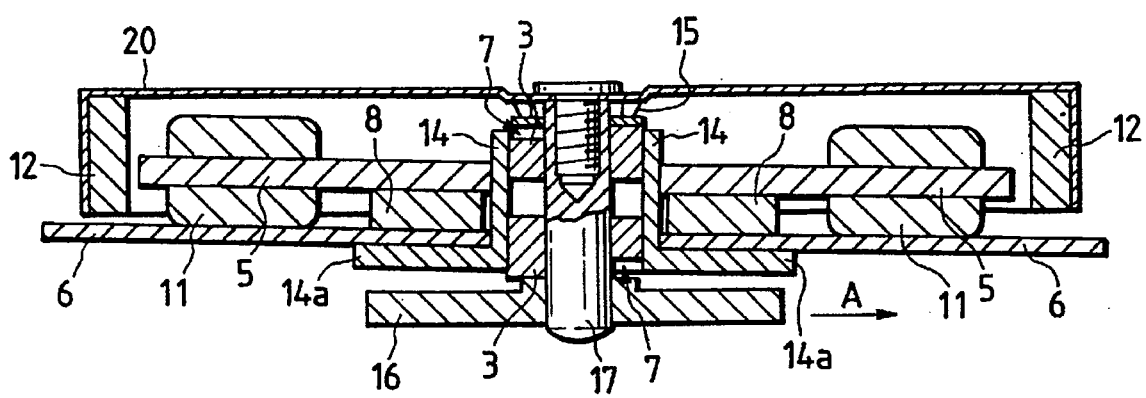
FIG. 6 is a sectional view showing a magnetic disk drive motor, which is still another embodiment of the device.

To ensure that the shaft 17 will be inclined reliably, two upper and lower bearings 3, 3, each having a cutaway portion 7, may be fitted with the inner circumference of the housing 14 as shown in FIG. 6. In this case, the upper bearing 3 out of the two bearings 3, 3 is arranged so that the cutaway portion 7 thereof faces upward and the lower bearing 3 is arranged so that the cutaway portion 7 thereof faces downward with the cutaway portions 7, 7 being 180° out of phase with each other around the shaft 17 at the respective upper and lower positions. As a result of this arrangement, the shaft 17 can be driven to rotate while inclined more reliably than in the aforementioned embodiments.

Figure 7:
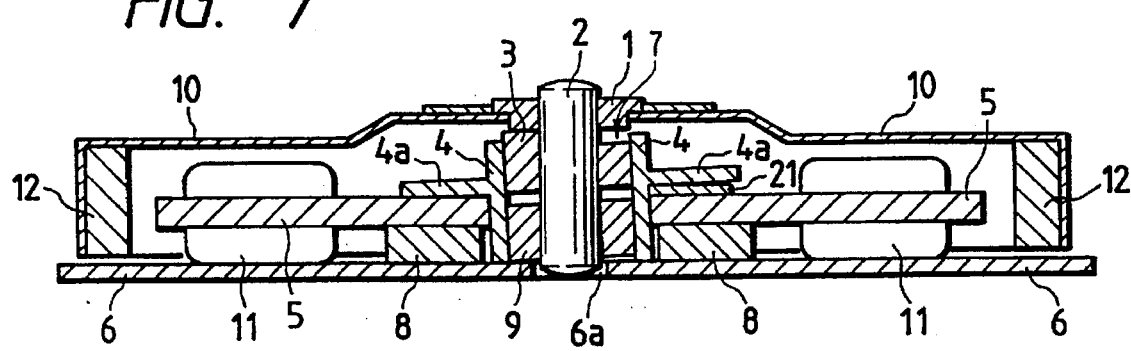
FIG. 7 is a sectional view showing a magnetic disk drive motor, which is still another embodiment of the device.

The thus constructed magnetic disk drive motors satisfy horizontality requirements. That is, the horizontality of the hub stand with respect to the base plate of these motors is within such a range as specified by the product standard even if the shaft is inclined. However, in the case where the horizontality exceeds the values specified by the product standard or in a like case, the horizontality of the hub stand with respect to the base plate must be corrected so as to be within the range specified by the product standard. In the magnetic disk drive motor having the rotor case 10 and the hub stand 1 on one side of the base plate 6 as shown in FIG. 1, the horizontality of the hub stand 1 with respect to the base plate 6 which exceeds the product specification range can be corrected, as shown in FIG. 7, by interposing a spacer 21 between the collar portion 4a on the side toward which the shaft 2 is inclined and the stator core 5 to thereby incline the housing 4 itself in a direction opposite to the direction of inclination of the shaft 2. As a result, the inclination of the shaft 2 is corrected to set the horizontality within the specified range.

Figure 8:
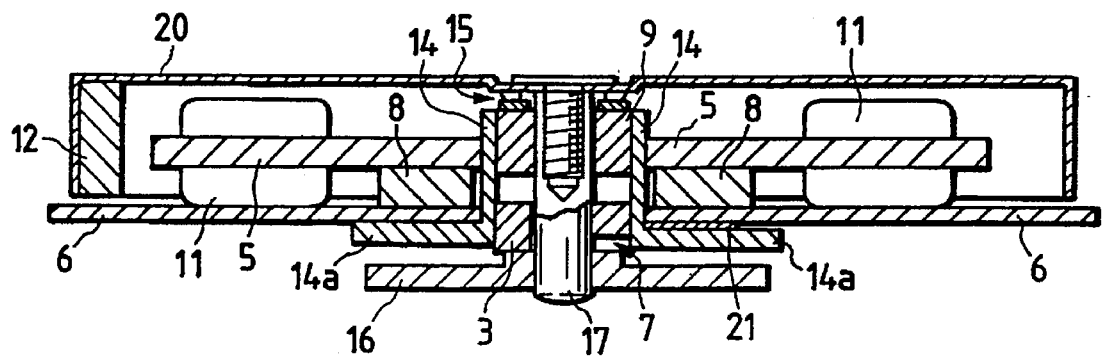
FIG. 8 is a sectional view showing a magnetic disk drive motor, which is still another embodiment of the device.

Similarly, in the magnetic disk drive motor having the hub stand 16 on a side opposite to the rotor case 20 with the base plate 6 interposed therebetween as shown in FIG. 5, the horizontality of the hub stand 16 with respect to the base plate 6 which exceeds the specified range can be corrected, as shown in FIG. 8, by interposing a spacer 21 between the collar portion 14a on the side toward which the shaft 17 is inclined and the base plate 6 to thereby incline the housing 14 itself in a direction opposite to the direction of inclination of the shaft 17.

Figure 9:
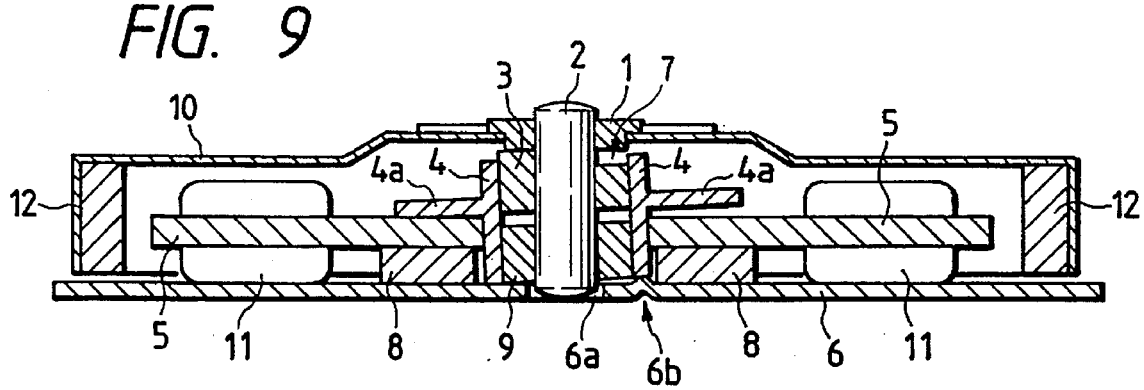
FIG. 9 is a sectional view showing a magnetic disk drive motor, which is still another embodiment of the device.
Figure 10:
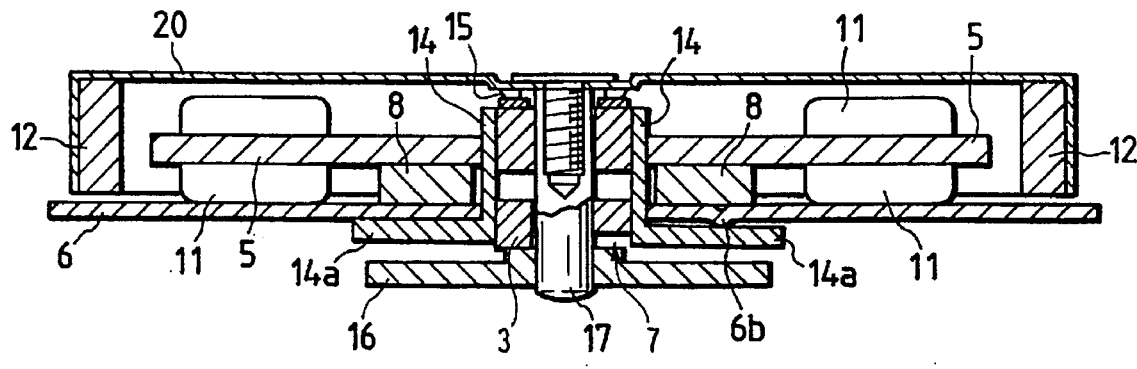
FIG. 10 is a sectional view showing a magnetic disk drive motor, which is still another embodiment of the device.

Further, as shown in FIG. 9, another method of correcting the horizontality of the hub stand involves the steps of: forming a projected portion 6b on the top surface of the base plate 6 on the side toward which the shaft 2 is inclined to cause the tip of the projected portion 6b to be abutted against the bottom surface of the housing 4 so that the housing 4 itself can be inclined in a direction opposite to the direction of inclination of the shaft 2. This method is advantageously applied also to a magnetic disk drive motor having the hub stand on a side opposite to the rotor case with the base plate interposed therebetween as shown in FIG. 10. That is, a projected portion 6b is formed on the bottom surface of the base plate 6 on the side toward which the shaft 17 is inclined, and the tip of the projected portion 6b is abutted against the collar portion 14a of the housing 14 to thereby incline the housing 14 itself in a direction opposite to the direction of inclination of the shaft 17.

Figure 11:
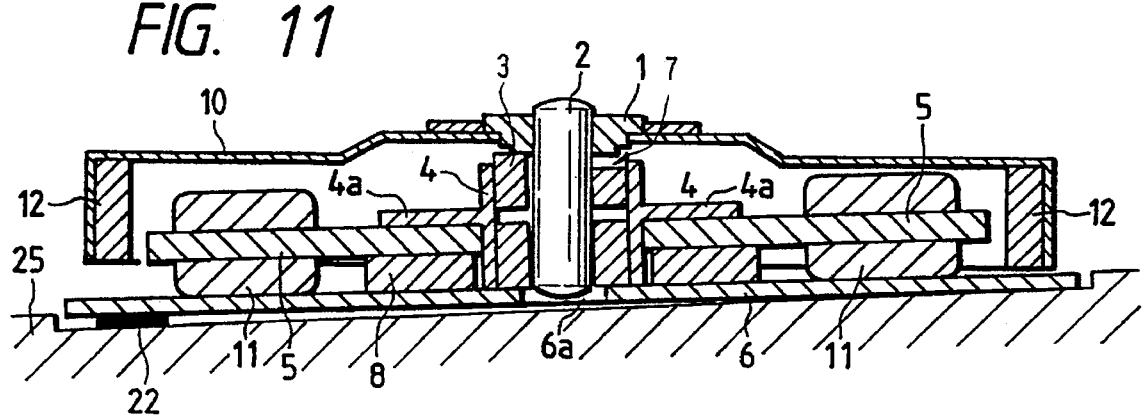
FIG. 11 is a sectional view showing a magnetic disk drive motor, which is still another embodiment of the device.
Figure 12:
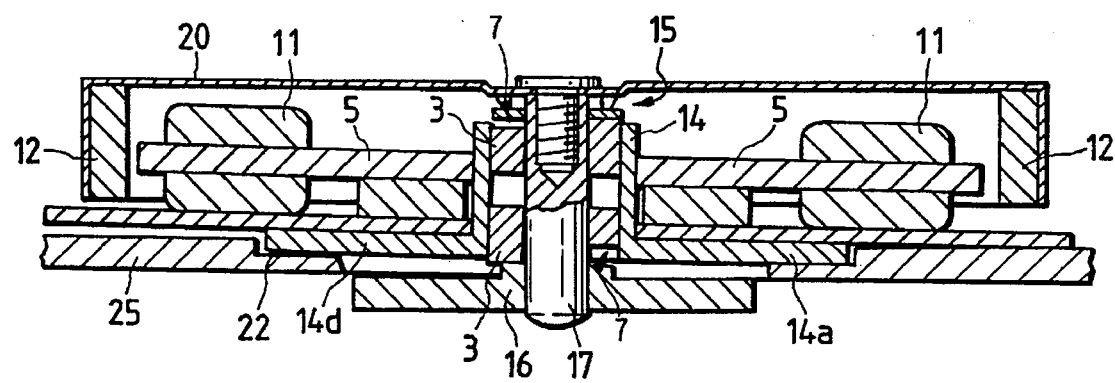
FIG. 12 is a sectional view showing a magnetic disk drive motor, which is still another embodiment of the device.

As shown in FIGS. 11 and 12, still another method of correcting the horizontality of the hub stand may involve the interposing of a spacer 22 between a chassis 25 and the base plate 6 or the housing 14 of a magnetic disk drive motor in mounting the magnetic disk drive motor on a chassis 25 of a magnetic disk drive apparatus.

Figure 13:
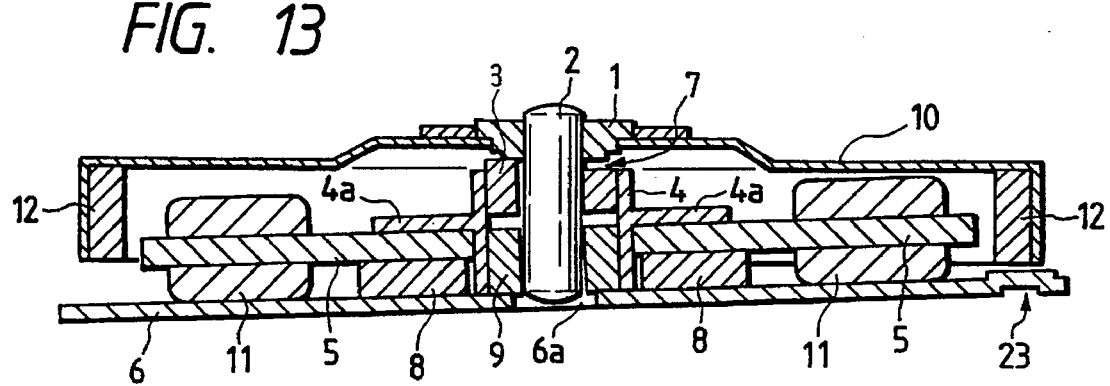
FIG. 13 is a sectional view showing a magnetic disk drive motor, which is still another embodiment of the device.

Still another embodiment of the device will be described next. In FIG. 13, while the basic construction of a magnetic disk drive motor is the same as that shown in FIG. 1, the base plate 6 made of iron has a projected portion 23 facing toward the drive magnet 12 at a portion thereof on the same side of the shaft 2 as the cutaway portion 7 of the bearing 3, and which confronts the end surface of the drive magnet 12. By the formation of the projected portion 23, the distance between the top of the projected portion 23 and the end surface of the drive magnet 12 becomes smaller than that between the other portion of the base plate 6 and the drive magnet 12, which in turn makes the magnetically attracting force of the drive magnet 12 at the projected portion 23 larger than the other portion. As a result, the shaft 2 is inclined with a strong force, thereby contributing to increasing lateral pressure applied to the shaft 2. If the angle and the size at which the cutaway portion 7 of the bearing 3 confronts the projected portion. 23 is selected arbitrarily, the magnitude of lateral pressure can also be changed arbitrarily.

Figure 14:
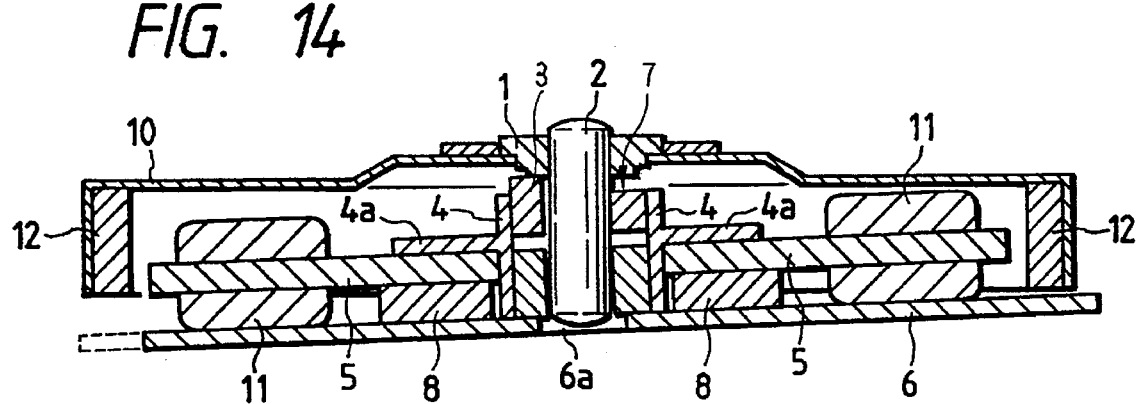
FIG. 14 is a sectional view showing a magnetic disk drive motor, which is still another embodiment of the device.

Further, as shown in FIG. 14, a portion of the base plate 6 which is 180° opposite to the cutaway portion 7 with the shaft 2 as the center and which becomes a plane of projection of the drive magnet 12 may be cut off. As a result of this design, the distribution of the attracting force on the circumference of the drive magnet 12 becomes nonuniform, thus making the magnetically attracting force of the base plate 6 on the side not having the cut portion larger. Hence, lateral pressure to be applied to the shaft 2 can be increased. If the angle at which the cutaway portion 7 of the bearing 3 and the cut portion of the base plate 6 confront each other with the shaft 2 as the center as well as the size of the cut portion of the base plate 6 are selected arbitrarily, the magnitude of lateral pressure can also be changed arbitrarily.

Figure 15:
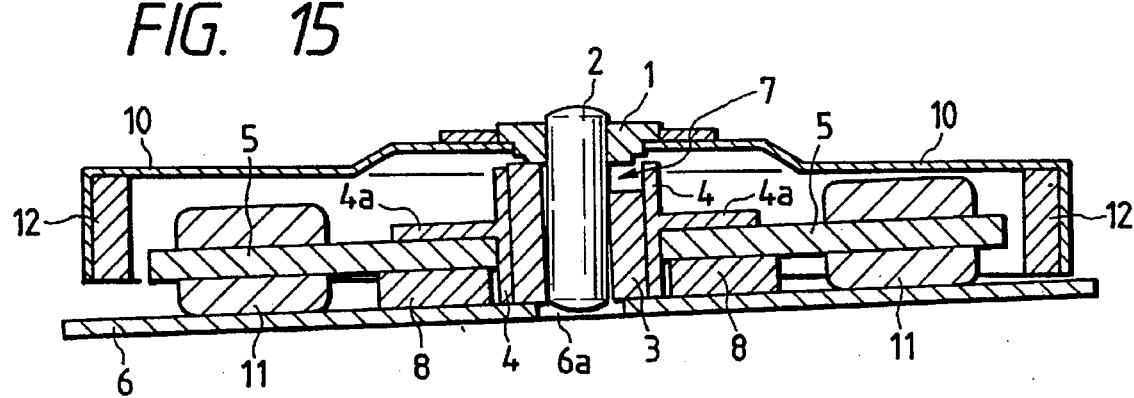
FIG. 15 is a sectional view showing a magnetic disk drive motor, which is still another embodiment of the device.
Figure 16:
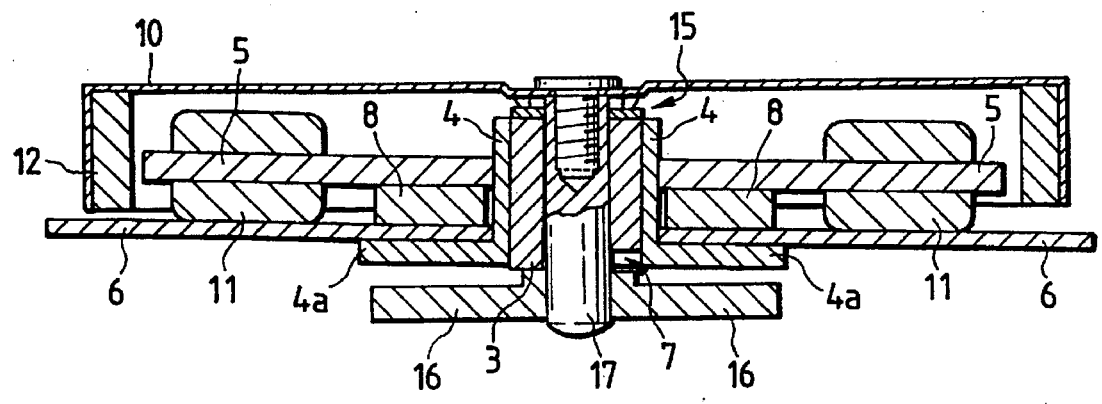
FIG. 16 is a sectional view showing a magnetic disk drive motor which is still another embodiment of the device.
Figure 17:
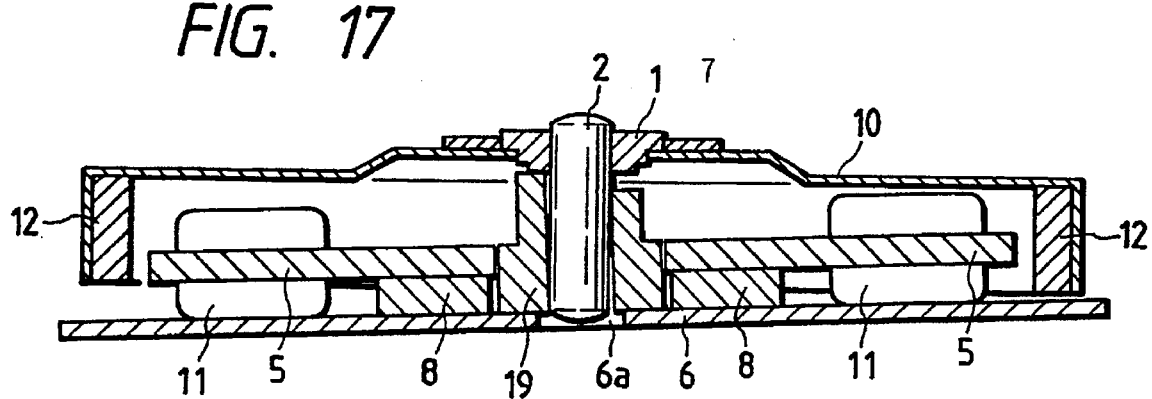
FIG. 17 is a sectional view showing a magnetic disk drive motor, which is still another embodiment of the device.
Figure 18:
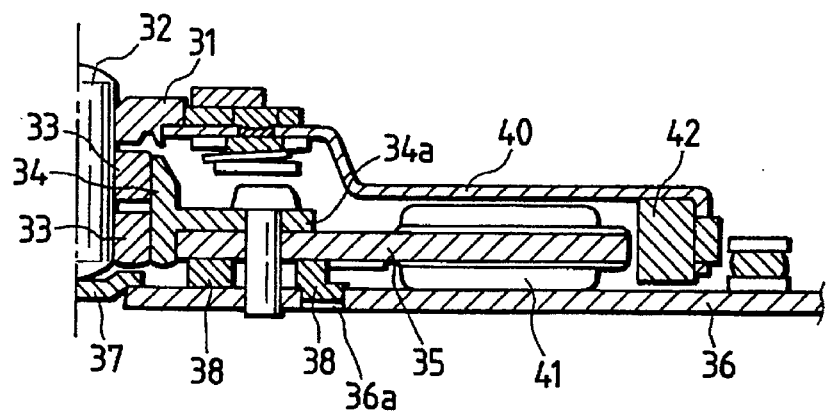
FIG. 18 is a sectional view showing a conventional magnetic disk drive motor.
Figure 19:
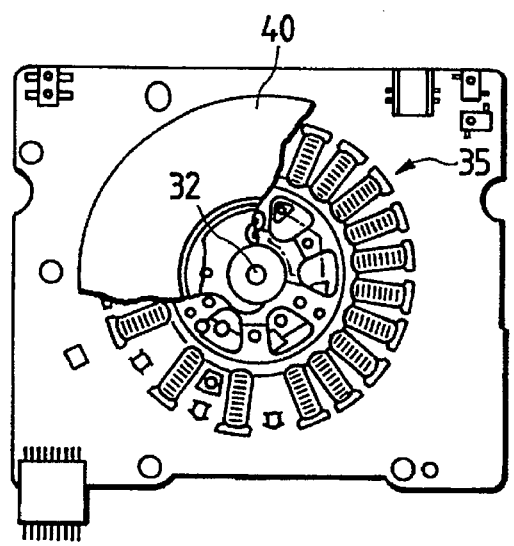
FIG. 19 is a plan view showing the conventional magnetic disk drive motor in partially cutaway form.

Any of the aforementioned embodiments are characterized as having two upper and lower bearings within the housing. However, the device may not be limited to those embodiments. For example, as shown in FIGS. 15 and 16, a magnetic disk drive motor may be constructed using only one bearing 3 with a cutaway portion 7. This design, similarly to the magnetic disk drive motors shown in FIGS. 1 and 5, can apply lateral pressure to the shaft to bias the shaft onto the bearing. As a result, play, vibration, and the like can be eliminated noticeably. Further, as shown in FIG. 17, a bearing 19 serving also as the housing is integrally formed by sintering, and may have the inner circumferential surface of the stator core 5 fitted with and fixed to the outer circumference of the bearing 19 directly. Such a cost reduction as to match the fact that the housing is not prepared as a separate member can be achieved. It may be noted that the outer diameter of a portion of the bearing 19 with which the stator core 5 is fitted is larger than the outer diameter of the other portions of the bearing because the outer diameter of this portion is set to the same value as the inner diameter of the stator core 5.

While the inclinations of the shaft and the hub stand are exaggerated in the drawings to facilitate the understanding of the description, the actual inclinations are only slight.

The first aspect of the device is characterized in that the magnetic disk drive motor includes: a hub stand for driving a disk while carrying the disk thereon; a shaft being fixed to the middle of the hub stand; a rotor case being attached to an end of the shaft and having a drive magnet on the inner side of a circumferential wall thereof; a substantially cylindrical housing rotatably supporting the shaft through a bearing; and a base plate supporting a stator core, wherein one end of the bearing is in slidable contact with the hub stand, and at least a part of the one end surface is cut away. Therefore, a part of the hub stand falls down toward the cutaway portion of the bearing to thereby incline the shaft independent of the size of the magnetic disk drive motor. As a result, lateral pressure can be applied to the shaft, which in turn contributes to implementing a rotation free from play and vibration.

The second aspect of the device is characterized as inclining the housing with respect to the shaft. Therefore, the horizontality of the hub stand with respect to the base plate can be corrected.

The third aspect of the device is characterized as interposing a spacer between the base plate or the housing of the magnetic disk drive motor and a chassis of the magnetic disk drive apparatus. Therefore, the magnetic disk drive motor can be inclined in a direction opposite to the inclination of the shaft, which in turn allows the horizontality of the hub stand with respect to the base plate to be corrected.

The fourth aspect of the device is characterized as integrally forming the housing and the bearing of a sintered member. Therefore, it is no longer necessary to prepare the housing as an independent member, which in turn contributes to reducing the cost of manufacture accordingly.

The fifth aspect of the device is characterized as projecting a part of the base plate confronting the drive magnet toward the drive magnet. Therefore, the attracting force of the drive magnet with respect to the base plate at this portion can be increased, which in turn increases lateral pressure applied to the shaft.

What is claimed is:

1. A magnetic disk drive motor comprising:

a hub stand for driving a disk while carrying the disk thereon;

a shaft fixed to the middle of the hub stand;

a rotor case attached to an end of the shaft and having a drive magnet on an inner side of a circumferential wall thereof;

a substantially cylindrical housing rotatably supporting the shaft through a bearing; and a base plate supporting a stator core, said stator core having salient poles that confront the drive magnet, wherein one end of the bearing is in direct slidable contact with the hub stand, and at least a portion of said one end of the bearing is cut away so that the hub stand is tilted toward the cut away portion of the bearing, and so that the shaft which is fixedly secured to the hub stand is held at a small angle in the bearing to prevent vibration and play when the hub stand is driven.

2. A magnetic disk drive motor according to claim 1, wherein the housing is inclined with respect to the shaft.

3. A magnetic disk drive motor according to claim 2, wherein a spacer is interposed between a chassis of a magnetic disk drive apparatus and one of said base plate and said housing.

4. A magnetic disk drive motor according to claim 1, wherein the housing and the bearing are integrally formed of a sintered member.

5. A magnetic disk drive motor according to claim 1, wherein a part of the base plate confronting the drive magnet is projected toward the drive magnet.

6. A magnetic disk drive motor according to claim 2, wherein said base plate comprises a projection that abuts against a portion of said housing so that said housing is tilted in a direction opposite to said hub stand.

7. A magnetic disk drive motor according to claim 1, wherein said bearing supports said shaft in a radial direction, and said bearing also supports said hub stand in a thrust direction by at least one end surface of said bearing.

8. A magnetic disk drive motor according to claim 2, wherein said housing has a collar portion.

9. A magnetic disk drive motor according to claim 1, wherein said base plate comprises an iron plate.

10. A magnetic disk drive motor according to claim 8, further comprising a spacer disposed between said collar portion and one of said base plate and said stator core so as to incline said housing in a direction opposite to the direction in which said hub is tilted.

11. A magnetic disk drive motor according to claim 1, wherein said base plate confronts the drive magnet, and wherein a portion of said base plate confronting the drive magnet is removed so that a magnetic attraction force of said base plate on a side of said base plate opposite the portion that is removed is increased and lateral pressure on said shaft is also increased.

* * * * *